Jan. 14, 1936. V. W. KLIESRATH 2,027,827
CLUTCH CONTROL MECHANISM
Filed Oct. 10, 1931

INVENTOR.
VICTOR W. KLIESRATH
BY H. O. Clayton
ATTORNEY

Patented Jan. 14, 1936

2,027,827

UNITED STATES PATENT OFFICE 2,027,827

CLUTCH CONTROL MECHANISM

Victor W. Kliesrath, South Bend, Ind., assignor to Bendix Aviation Corporation, South Bend, Ind., a corporation of Delaware Application October 10, 1931, Serial No. 568,080

1 Claim. (Cl. 121—46.4)

This invention relates to control mechanisms for automotive vehicles, and particularly to power operated means for controlling the operation of a conventional clutch structure.

It is the principal object of the invention to provide a very simple and compact three-way control valve for a vacuum operated clutch controlling fluid motor.

Yet another object of the invention is to provide an arrangement whereby the aforementioned control valve is operated by a pedal, substituted for the conventional clutch pedal, and which pedal also serves to operate the clutch manually in the event of failure of the power means, after the pedal is moved a sufficient distance to normally operate the valve.

Other objects of the invention and desirable details of construction will become apparent from the following detailed description of a preferred embodiment of the invention taken in conjunction with the accompanying drawing, in which.

Figure 1:
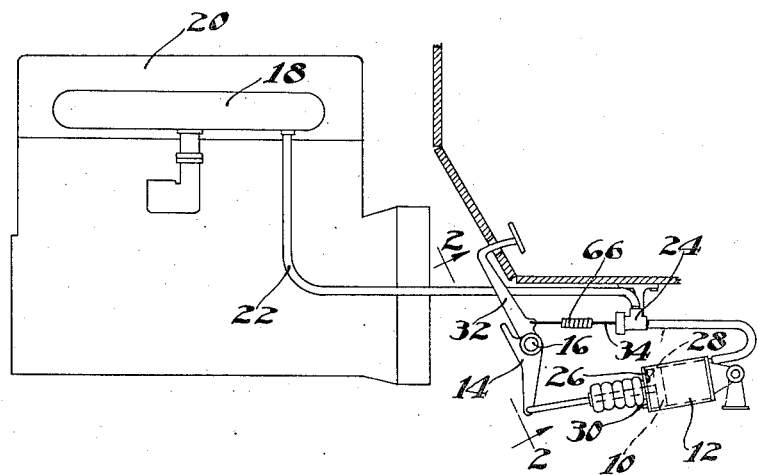
Figure 1 is a diagrammatic view of the clutch controlling mechanism constituting the invention.
Figures 2, 4:
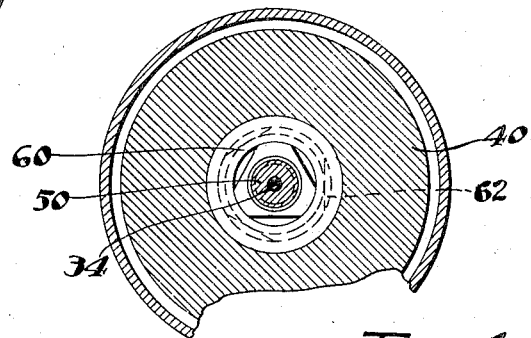
Figure 2 is a view, looking in the direction of the arrows 2—2 of Figure 1, disclosing the pedal operating elements of the construction.
Figure 4 is a section through the control valve taken on line 4—4 of Figure 3.

The clutch control mechanism in its essential details is disclosed diagrammatically in Figure 1, wherein the reciprocable piston 10 of a double ended fluid motor or actuator 12 is connected to a two-armed crank member 14 keyed to the clutch operating shaft 16. The fluid motor is connected to the intake manifold 18 of an internal combustion engine 20 by a flexible conduit 22 and a three-way control valve 24, rigidly secured to the chassis, is interposed in said connection. The left end wall 26 of the motor is provided with an inwardly opening check valve 28 to permit the piston to be moved to the right in the declutching operation, and said wall is also provided with a manually adjustable needle valve 30 to predetermine the rate of efflux of air from the compression side of the motor to thereby control the rate of clutch engagement.

The control valve is adapted to be operated, to energize the motor and disengage the clutch, by means of a pedal member 32, loosely mounted on the clutch shaft 16 and connected to the movable elements of the valve 24 by a yieldable connection 34.

Figure 3:
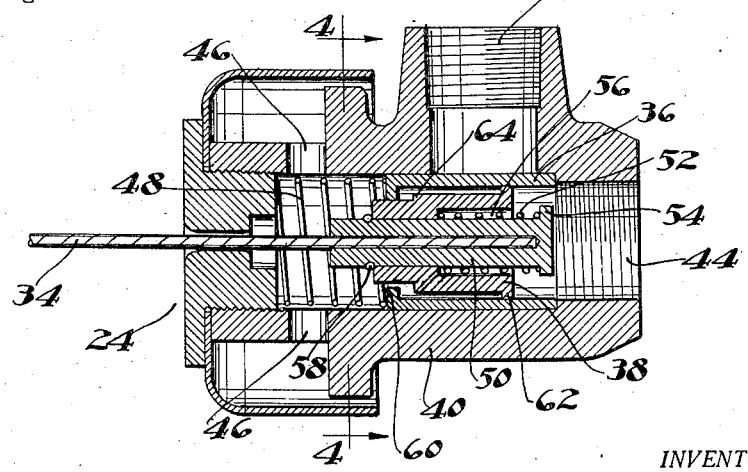
Figure 3 is a longitudinal sectional view through the control valve of Figure 1.

The details of the control valve constitute an important feature of the invention and, briefly, include reciprocable relatively spaced sleeve members 36 and 38 housed within the valve casing 40, the latter provided with inlet and outlet ports 42 and 44, respectively, and with atmospheric or venting ports 46. The outer of the two sleeve members 36 is normally pressed, by spring 48, to the right, Figure 3, to close inlet port 42 and cut off communication between the manifold 18 and suction side of the motor. The inner of the two sleeves 38 is slidably mounted on cylindrical valve operating member 50, the latter being securely mounted on the connection 34. The inner sleeve member 38 is also normally positioned on the operating member 50 between a spring 52, interposed between a flange or stop 54 on the end of the member 38 and the end of a counterbored recess 56 in the sleeve 38, and a ring 58 mounted on the operating member 38. The sleeve members 36 and 38 are also provided, at opposite ends, with end flanges 60 and 62, respectively, the flange 62 being triangular in outline. The left end portion of member 38 is also of triangular outline, thus providing a structure permitting a flow of air between the sleeves.

Referring now to the operation of the clutch controlling mechanism, the parts are disclosed in their clutch engaged position in Figure 1. In this relation of the parts the valve parts are as disclosed in Figure 3, the sleeve 36 cutting off communication between the manifold 18 and motor 12, and the sleeve 38 providing communication between the atmosphere and motor via atmospheric openings 46 and the aforementioned opening provided between the flanged sleeve ends 60 and 62. The suction side of the motor is thus vented to atmosphere, permitting the motor piston 10 to assume the clutch engaged position disclosed in Figure 1.

Should the driver now desire to effect a disengagement of the clutch, he depresses the pedal 32, thus moving an abutment portion 64 of sleeve 38 into contact with the flange 60, closing off communication between the atmosphere and motor, subsequent movement of the pedal then moving sleeve 36 to the left, collapsing spring 48, to register ports 42 and 44 to evacuate the suction side of the motor and disengage the clutch. Such an evacuation is made possible by virtue of the evacuated condition of the manifold at closed throttle, which is the usual position of the throttle at the time it is desired to disengage the clutch. It will be apparent that with the movement of the sleeves to interconnect the ports 42 and 44 there results a differential of pressures upon the two sleeves acting as a unit; this by virtue of the subatmospheric and atmospheric pressures acting respectively on opposite sides of the sleeves. The resultant effect is to increase the load upon the driver's foot in direct proportion to the degree of evacuation of the clutch motor and also to collapse the spring 52, which is in series in the connection between the sleeve members and the clutch pedal 32. Accordingly, should the driver wish to only partially disengage or slip the clutch, as for example in parking the car, the clutch pedal 32 is only partially depressed, sufficiently however to effect the aforementioned connection between the manifold and the motor, and thereafter the sleeves 36 and 38 as a unit move to the right, Figure 3, to collapse the spring 52 and cut off the aforementioned connection.

The clutch is thus maintained partially disengaged, the degree of disengagement being determined by the positon of the pedal 32, the sleeves 36 and 38 together with the collapsible spring 52 and other structure providing a so-called pressure balanced type of follow-up valve. Intermittent movement of the clutch pedal toward the fully depressed position serves, therefore, to progressively disengage the clutch, and likewise a corresponding releasing movement of the pedal serves to progressively move the clutch plates into engagement.

Such a release of the pedal 32 serves to permit the sleeve 36 to be moved to the right under the action of the spring 48 and the aforementioned pressure differential acting on the sleeve and also permits the sleeve 38 to be moved to the right by virtue of the aforementioned differential, that is the atmospheric pressure acting on the end walls of the member 50 and sleeve 38. The vacuum is thus cut off and the motor vented to permit the clutch to engage. This engaging movement is dampened by the controlled efflux of air from the compression side of the motor, the needle valve 30 being adjusted to effect the desired rate of clutch plate movement.

Should the vacuum operation of the aforementioned mechanism fail, for any reason, the pedal, in its downward movement will contact the upper arm of the two-armed clutch operating crank member 14 to thus manually disengage the clutch in the conventional manner. A spring 66 is interposed in the connection 34 between the pedal 32 and valve 24 to obviate injury to the valve parts in the event of such an operation of the mechanism.

While one illustrative embodiment has been described, it is not my intention to limit the scope of the invention to that particular embodiment, or otherwise than by the terms of the appended claim.

I claim:

A three-way control valve for pressure operated fluid motors comprising a bored casing having inlet, outlet and atmospheric ports, a reciprocable spring pressed sleeve member within the bore of said casing, said member serving to control the communication between said inlet and outlet ports, a second reciprocable sleeve member slidable within said first mentioned sleeve member and adapted to control the communication between said atmospheric and outlet ports and means, slidable within said last mentioned sleeve member, for successively operating both of said sleeve members, each of said sleeve members being provided with a triangular-shaped end flange member adapted to slidingly contact the contiguous sleeve member.

VICTOR W. KLIESRATH.